US008792923B2

(12) United States Patent
Kato

(10) Patent No.: US 8,792,923 B2
(45) Date of Patent: Jul. 29, 2014

(54) RADIO BASE STATION, RADIO COMMUNICATION TERMINAL, RADIO COMMUNICATION SYSTEM, RADIO COMMUNICATION METHOD AND COMMUNICATION MANAGEMENT METHOD, USING ALLOCATION OF SHARED FREQUENCY

(75) Inventor: Osamu Kato, Fukuoka (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/325,901

(22) Filed: Dec. 14, 2011

(65) Prior Publication Data

US 2012/0165057 A1    Jun. 28, 2012

(30) Foreign Application Priority Data

Dec. 27, 2010    (JP) ................. 2010-290474

(51) Int. Cl.
*H04W 72/04*    (2009.01)
(52) U.S. Cl.
USPC ...... 455/509; 455/452.1; 455/454; 455/67.11
(58) Field of Classification Search
USPC ........ 455/509, 452.1, 452.2, 450, 67.11, 454, 455/561, 507; 370/329, 462
See application file for complete search history.

(56) References Cited

U.S. PATENT DOCUMENTS

| 7,547,801 | B2 | 6/2009 | Pohl |
| 2007/0299279 | A1 | 12/2007 | Pohl |
| 2008/0089279 | A1* | 4/2008 | Hu et al. ............ 370/329 |
| 2008/0300890 | A1 | 12/2008 | Dawson |
| 2009/0154415 | A1* | 6/2009 | Park et al. ............ 370/329 |

FOREIGN PATENT DOCUMENTS

| EP | 2 083 594 | 7/2009 |
| JP | 2008-7506 | 1/2008 |
| JP | 2010-118853 | 5/2010 |
| JP | 2010-154296 | 7/2010 |
| JP | 2010-183224 | 8/2010 |

OTHER PUBLICATIONS

International Search Report dated Mar. 20, 2012.
Written Opinion of the International Searching Authority dated Mar. 20, 2012.
P. Bahl, et al., "White Space Networking with Wi-Fi like Connectivity," SIGCOMM, Aug. 17-21, 2009, pp. 27-38.

* cited by examiner

*Primary Examiner* — John J Lee
(74) *Attorney, Agent, or Firm* — Seed IP Law Group PLLC

(57) ABSTRACT

In a radio communication system that conducts a communication between a radio base station and a radio communication terminal, the radio base station and the radio communication terminal conduct communication though traffic in a shared frequency utilizing white space in addition to a dedicated frequency allocated to the radio communication system. The traffic through which the communication is established between the radio base station and the radio communication terminal includes first traffic whose bandwidth is guaranteed and second traffic whose bandwidth is not guaranteed. Radio resources of the dedicated frequency are allocated to the first traffic and radio resources of the shared frequency are allocated to the second traffic.

14 Claims, 11 Drawing Sheets

FIG.2

|  |  | DRR | SRR |
|---|---|---|---|
| TERMINAL A | GT | PREFERENTIAL ALLOCATION | ALLOCABLE |
|  | NT | ALLOCABLE | PREFERENTIAL ALLOCATION |
| TERMINAL B | GT | PREFERENTIAL ALLOCATION | NON ALLOCABLE |
|  | NT | ALLOCABLE | NON ALLOCABLE |

FIG.7

| INTERVAL [DRR=10] / TERMINAL | #i | #i+1 | #i+2 | #i+3 | ... |
|---|---|---|---|---|---|
| #1 TERMINAL-A | GT=3<br>NT=2<br>SRR=10 | GT=3<br>NT=8<br>SRR=10 | GT=3<br>NT=4<br>SRR=10 | GT=3<br>NT=0<br>SRR=10 | |
| #2 TERMINAL-A | GT=1<br>NT=5<br>SRR=8 | GT=1<br>NT=5<br>SRR=8 | GT=1<br>NT=2<br>SRR=0 | GT=1<br>NT=10<br>SRR=0 | |
| #3 TERMINAL-B | GT=3<br>NT=4 | GT=3<br>NT=2 | GT=3<br>NT=9 | GT=3<br>NT=10 | |
| #4 TERMINAL-B | GT=0<br>NT=0 | GT=0<br>NT=0 | GT=4<br>NT=20 | GT=4<br>NT=10 | |
| $\sum_{i=1}^{4} GT$ | 7 | 7 | 11 | 11 | |
| $\sum_{i=1}^{4} (GT+NT)$ | 18 | 22 | 46 | 41 | |

FIG.8

| INTERVAL<br>TERMINAL | #i | #i+1 | #i+2 | #i+3 ... |
|---|---|---|---|---|
| #1 TERMINAL-A | GT=3→DRR<br>NT=2→SRR | GT=3→DRR<br>NT=8→SRR | GT=3→ {GT=2→DRR<br>         {GT=1→SRR<br>NT=4→ SRR | GT=3→ {GT=2→DRR<br>         {GT=1→SRR<br>NT=0 |
| #2 TERMINAL-A | GT=1→DRR<br>NT=5→SRR | GT=1→DRR<br>NT=5→SRR | GT=1→DRR<br>NT=2→NG | GT=1→DRR<br>NT=10→NG |
| #3 TERMINAL-B | GT=3→DRR<br>NT=4→ {NT=3→DRR<br>        {NT=1→NG | GT=3→DRR<br>NT=2→DRR | GT=3→DRR<br>NT=9→NG | GT=3→DRR<br>NT=10→NG |
| #4 TERMINAL-B | GT=0<br>NT=0 | GT=0<br>NT=0 | GT=4→DRR<br>NT=20→NG | GT=4→DRR<br>NT=10→NG |

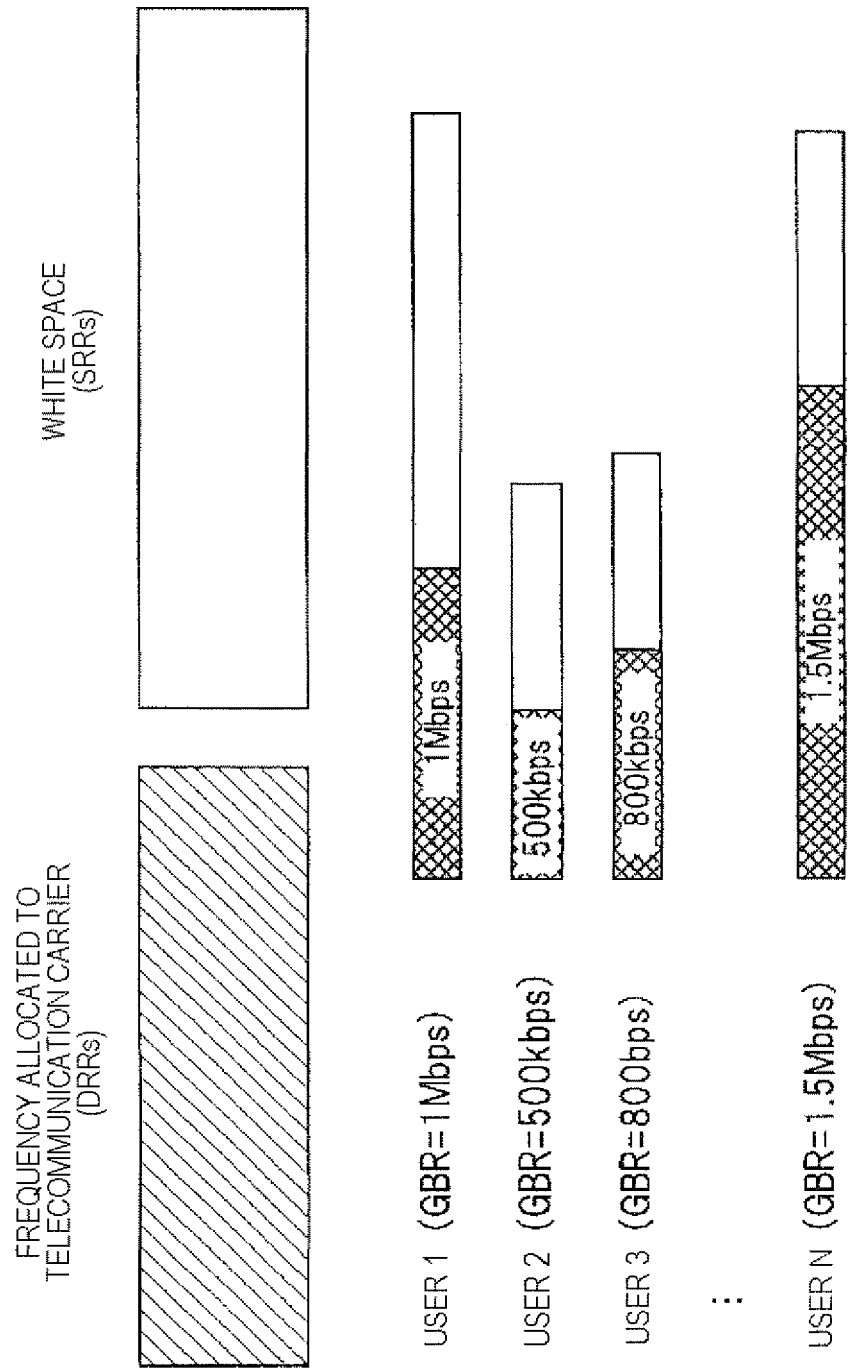

FIG.11

| INTERVAL [DRR=10] TERMINAL | #i | #i+1 | #i+2 | #i+3 | ... |
|---|---|---|---|---|---|
| #1 TERMINAL-B | GT=3→DRR<br>NT=2→DRR | GT=3→DRR<br>NT=8→{NT=2→DRR<br>      {NT=6→NG | GT=3→DRR<br>NT=4→NG | GT=3→DRR<br>NT=0 | |
| #2 TERMINAL-B | GT=1→DRR<br>NT=5→{NT=1→DRR<br>      {NT=4→NG | GT=1→DRR<br>NT=5→{NT=1→DRR<br>      {NT=4→NG | GT=1→DRR<br>NT=2→NG | GT=1→DRR<br>NT=10→NG | |
| #3 TERMINAL-B | GT=3→DRR<br>NT=4→NG | GT=3→DRR<br>NT=2→NG | GT=3→DRR<br>NT=9→NG | GT=3→DRR<br>NT=10→NG | |
| #4 TERMINAL-B | GT=0<br>NT=0 | GT=0<br>NT=0 | GT=4→{GT=3→DRR<br>       {GT=1→NG<br>NT=20→NG | GT=4→{GT=3→DRR<br>       {GT=1→NG<br>NT=10→NG | |
| $\sum_{i=1}^{4} GT$ | 7 | 7 | 11 | 11 | |
| $\sum_{i=1}^{4} (GT+NT)$ | 18 | 22 | 46 | 41 | |

RADIO BASE STATION, RADIO COMMUNICATION TERMINAL, RADIO COMMUNICATION SYSTEM, RADIO COMMUNICATION METHOD AND COMMUNICATION MANAGEMENT METHOD, USING ALLOCATION OF SHARED FREQUENCY

BACKGROUND

1. Technical Field

The present invention relates to a radio communication system that conducts radio communication between a radio base station and a radio communication terminal, as well as to a radio base station and a radio communication terminal therefor.

2. Background Art

Telecommunication carriers provide various communication services by means of establishing; for instance, a mobile communication network and implementing a mobile communication service for a portable phone, and the like. When utilizing a radio communication link, the communication carriers are allowed to utilize frequencies only at an allocated frequency. Therefore, maximum effective utilization of the allocated frequency has been desired under recent circumstances where communication traffic is on the increase.

Example effective utilization of the allocated frequency is a bandwidth switching technique disclosed in; for instance, JP-A-2010-118853. The bandwidth switching technique aims at controlling allocation of a frequency band for an uplink data communication and a frequency band for a downlink data communication on the basis of occupancies of respective channels in a frequency band and a free bandwidth, thereby effectively utilizing an uplink frequency band and a downlink frequency band.

By way of example, there is provided an assumption that, in a radio communication system which configures a mobile communication network by means of arranging radio base stations at a plurality of sites, a telecommunication carrier divides frequency resources and allocates the divided resources to a plurality of users connected to one radio base station. On this occasion, assuring an individual user of the minimum throughput results in a reduction in the number of users concurrently connected. Difficulty is encountered in accomplishing both provision of the minimum guaranteed throughput and an increase in the number of users concurrently connected. In reality, it is hard to realize an application field where setting of the minimum guaranteed throughput is desired.

The example described in connection with JP-A-2010-118853 is intended for effectively utilizing frequency resources within an allocated frequency band, and effective utilization of the frequency resources can be implemented within the allocated frequency band. However, when a free bandwidth does not exist in the allocated frequency band, difficulty is encountered in accomplishing both provision of the minimum guaranteed throughput and an increase in the number of users concurrently connected.

The present invention has been conceived in light of the circumstances and aims at making it possible to assure in radio communication the throughput and the number of users concurrently connected at a maximum depending on the situation without being restricted to a bandwidth of currently allocated frequencies.

SUMMARY

In a radio communication system according to an aspect of the invention, that conducts a communication between a radio base station and a radio communication terminal, the radio base station and the radio communication terminal conduct communication though traffic in a shared frequency utilizing white space in addition to a dedicated frequency allocated to the radio communication system. The traffic through which the communication is established between the radio base station and the radio communication terminal includes first traffic whose bandwidth is guaranteed and second traffic whose bandwidth is not guaranteed. Radio resources of the dedicated frequency are allocated to the first traffic and radio resources of the shared frequency are allocated to the second traffic.

In addition to the dedicated frequencies, the shared frequencies utilizing the white space are used by means of the configurations mentioned above. Accordingly, it becomes possible to assure in radio communication the throughput and the number of users concurrently connected at a maximum depending on the situation without being restricted to a bandwidth of currently allocated frequencies.

According to the aspect of the present invention, it becomes possible to assure depending on the situation the throughput and the number of users concurrently connected at a maximum without being restricted to a bandwidth of currently allocated frequencies in radio communication.

BRIEF DESCRIPTION OF THE DRAWINGS

In the accompanying drawings:

FIG. 2 is a table for explaining a method for allocating radio resources at a base station in the radio communication system according to the embodiment;

FIG. 7 is a time chart showing an example of GT and NT of the respective terminals and an example amount of available SRR resources;

FIG. 8 is a time chart showing example allocation of GT and NT of the respective terminals to DRRs or SRRs;

FIG. 9 is a drawing schematically showing a frequency allocated to a telecommunication carrier that operates the radio communication system, white space, and allocation of a plurality of users (terminals) to the radio resources;

FIG. 11 is a time chart showing example allocation of GT and NT of the respective terminals to the DRRs in the comparative example.

DETAILED DESCRIPTION

In an embodiment, there are provided explanations on a configuration of a radio communication system and a method for utilizing radio resources by means of taking as an example communication between a radio base station (hereinafter also referred to simply as a "base station") and a radio communication terminal (hereinafter also referred to simply as a "terminal") in a radio communication system that builds a mobile communication network by means of arranging radio base stations at a plurality of sites.

In the embodiment, radio resources are allocated in radio communication by utilization of an unutilized frequency among frequencies allocated for another purpose; namely, so-called white space. The white space refers to a frequency that is allocated for a certain purpose (i.e., a frequency license is granted to a specific frequency band), such as a broadcast, and also available for another purpose (i.e., the frequency is not used) according to temporal restrictions, geographical restrictions, and technical restrictions. For instance, unoccupied channels unused for broadcast in a certain area, among broadcast channels, are mentioned. Specific examples include megahertz bands (54 to 60 MHz, 76 to 88 MHz, 174 to 216 MHz, 470 to 608 MHz, and 614 to 698 MHz) in the U.S. and megahertz bands (90 to 108 MHz and 170 to 222 MHz for a VHF band, and 710 to 770 MHz for an UHF band) in Japan.

Various methods for utilizing the white space have already been proposed; for instance, an area-restricted one-segment broadcast using white space for a broadcast in a specific area and during a specific period, and a digital signage using white space for an advertizing service at a specific location and during a specific period. However, conceivable challenges to be met by these utilization methods include an investment problem on construction of an application specific radio communication system and a problem on a use of a white space frequency being not guaranteed. Accordingly, in the present embodiment, a white space is utilized for radio communication established between a base station and a terminal in particularly, a radio communication system which configures a mobile communication network for a cellular system, thereby effectively utilizing radio resources.

Figure 1:
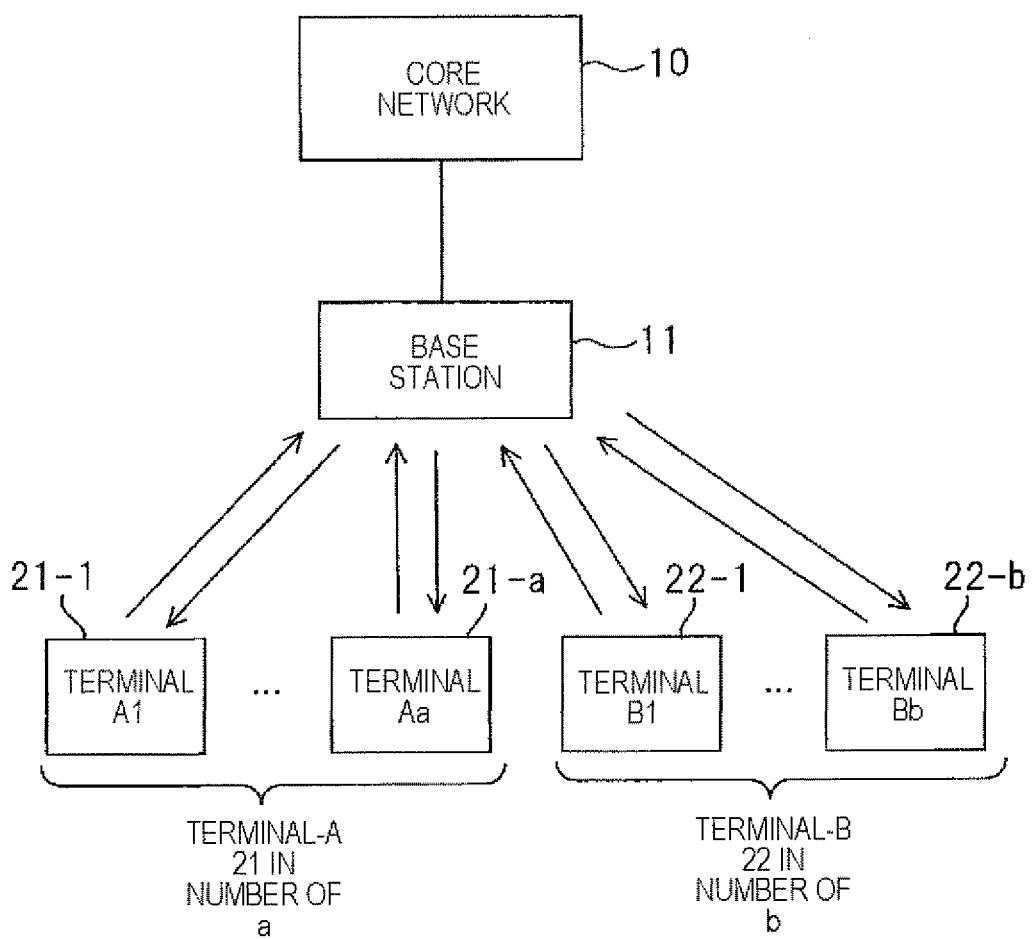
FIG. 1 is a block diagram showing a general configuration of a radio communication system according to an embodiment of the present invention.

FIG. 1 is a block diagram showing a general configuration of a radio communication system according to the embodiment of the present invention. The radio communication system according to the present embodiment includes a base station 11 connected to a core network 10 of a mobile communication network and a terminal-A 21 capable of using white space and a terminal-B 22 incapable of using the white space, which are taken as terminals for conducting a radio communication with respect to the base station 11. The terminal-A 21 is assumed to include a terminal-A 21-1 to a terminal-A 21-a, and the terminal-B 22 is assumed to include a terminal-B 22-a1 to a terminal-B 22-b. In relation to a radio communication terminal, only the terminal-A 21 may be assumed to be subordinate to a certain base station 11.

The terminal-A 21 is an advanced terminal that has, as an additional capability intended for use with the terminal-B 22, a capability of enabling use of a shared frequency in the white space. The terminal-B 22 is a legacy terminal that can use only the dedicated frequency allocated to the radio communication system (substantially a radio base station that is a party on the other end of communication) and that does not have a capability of using the shared frequency in the white space.

The terminal-A 21 has the following capabilities as the capability of enabling use of the shared frequency.

(1) A capability of detecting shared frequency availability information.

(2) A capability of reporting shared frequency availability information to a base station.

(3) A capability of receiving an allocated shared frequency and performing transmission and reception operations by use of the allocated shared frequency.

(4) A capability of being allocated both a shared frequency and a dedicated frequency and performing transmission and reception operations by use of these frequencies.

The terminal-A 21 can have either all of the four capabilities (1) to (4) or only the capabilities (1), (2), and (3).

There is described a method for allocating radio resources at the base station of the radio communication system according to the embodiment. FIG. 2 is a table for explaining the method for allocating radio resources at the base station of the radio communication system according to the embodiment. In the radio communication system, communication traffic whose minimum throughput is guaranteed (bandwidth guarantee) is hereunder called GT (guaranteed traffic), whilst communication traffic whose bandwidth is not guaranteed is hereunder called an NT (non-guaranteed traffic). Here the term "traffic" generally refers to a communication channel or a traffic amount (e.g. unit is bps: bits per second). Here, reference symbols GT and NT signify communication channels. GT corresponds to a first traffic whose bandwidth is guaranteed, and NT corresponds to a second traffic whose bandwidth is not guaranteed. Further, radio resources of the dedicated frequency allocated to the radio communication system (substantially a radio base station acting as a station of interest) are referred to as DRRs (dedicated radio resources), and radio resources of the shared frequency belonging to the white space are hereunder referred to as SRRs (shared radio resources).

Example GT includes transfer data; namely, high-priority data requiring real-time data transfer, such as audio data or video data for speech communication and transmission and reception data for interactive communication (various information data for a business transaction, or the like). Example NT includes low-priority data that does not necessarily require real-time data transfer, such as data transmitted or received at a web access, FTP (file transfer protocol) transfer data, and data for a communication conducted in the background. When video data are subjected to hierarchical encoding such as H.264/SVC (Scalable Video Coding), high-level hierarchical important data can also be taken as GT, and low hierarchical other data can also be taken as NT.

In FIG. 2, a term "preferred allocation" designates resources to which traffic of GT and NT, is allocated in preference, whereas a term "allocable" designates resources to which traffic can be allocated. Further, a term "unallocable" designates resources to which traffic cannot be allocated. Reference symbol SRR shown in FIG. 2 denotes shared radio resources that are available for each terminal-A.

When the party on the other side of communication is the terminal-A 21, the base station 11 allocates GT to DRRs and NT to SRRs. When the DRRs are fully used, the base station 11 can also allocate GT to the SRRs. Even when the DRRs have a leeway, both GT and NT can also be assigned to the SRRs if both GT and NT are transmitted or received by use of the SRRs.

When the party on the other side of communication is the terminal-B 22, the base station 11 allocates GT to the DRRs. When the DRRs have a leeway, the base station 11 can allocate NT to the DRRs. Since the party on the other side is the terminal-B 22, SRRs are unavailable. Hence, neither GT nor NT can be allocated to the SRRs.

As mentioned above, the base station allocates the radio resources of the dedicated frequency and the radio resources of the shared frequency to each of the terminals, thereby enabling the terminals capable of using a shared frequency to use the shared frequency.

Figure 3:
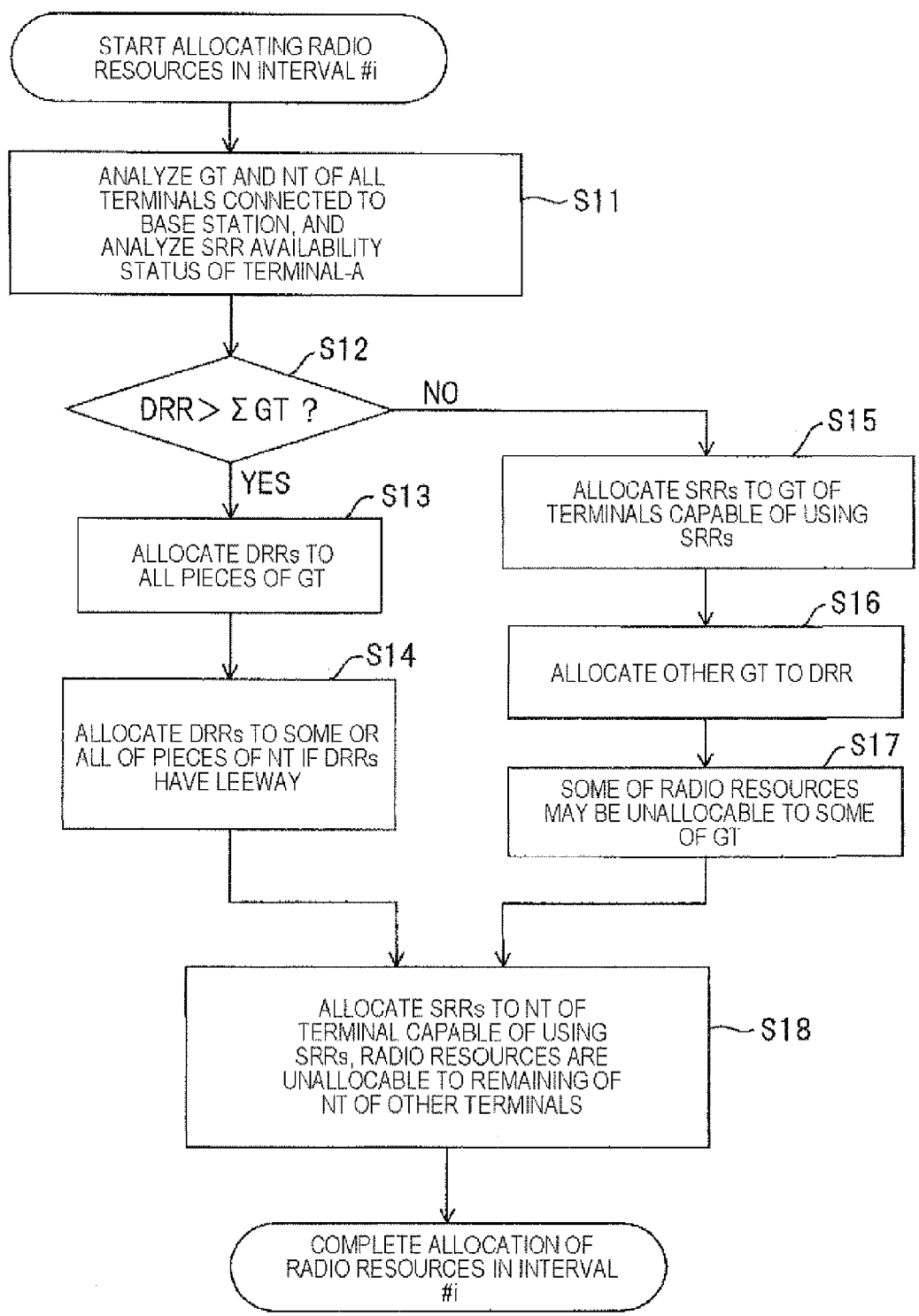
FIG. 3 is a flowchart of procedures for allocating the radio resources at the base station according to the embodiment.

FIG. 3 is a flowchart of procedures for allocating radio resource at the base station according to the embodiment. An explanation is now given to procedures for allocating radio resources during a predetermined time interval #i ("i" is an arbitrary integer).

The base station 11 first analyzes GT and NT of all terminals connected to the base station, and analyzes an SRR available status of the terminal-A (step S11). On this occasion, the base station 11 ascertains GT and NT required for respective terminals on all connected terminals, and ascertains frequencies of the available SRRs and an amount of resources on the terminal-A.

Next, the base station 11 determines whether or not a total amount of radio resources at the dedicated frequency is greater than a total amount of the traffic whose bandwidth is guaranteed. Specifically, the base station 11 determines whether or not the total amount of DRRs allocable to the respective terminals is greater than a total amount of GT for all of the terminals (DRR>ΣGT) (step S12). DRR and GT only used in inequalities or equalities mean not traffic but traffic amount hereinafter. For instance, when the radio resources are frequency bands, it is determined whether or not all frequency bands allocable as DRRs are greater than the total amount of frequency bands for all of the terminals. Further, in relation to the number of channels, it is determined whether or not the total number of channels allocable as DRRs is greater than the total number of channels for all of the terminals. When the DRRs are greater in amount than ΣGT (YES is selected in step S12), the base station 11 allocates the DRRs to GT of all of the terminals (step S13). If the DRRs have a leeway, the base station 11 allocates the DRRs to some or all of pieces of NT (step S14).

In the meantime, when the DRRs are smaller in amount than ΣGT (NO is selected in step S12), the base station 11 allocates the SRRs to GT of the terminals capable of using SRRs (step S15). The base station 11 allocates GT of the other terminals (i.e., GT other than GT allocated to the SRRs) to the DRRs (step S16). On this occasion, depending on a magnitude relationship between the amount of DRRs and the total amount of GT, there is a possibility that some of pieces of GT (remaining allocated portions of GT) cannot be allocated radio resources (step S17). Since admission control is usually performed when each of the terminals makes a connection to the base station, a case where the DRRs become small in amount than ΣGT is an irregular case.

Subsequent to step S14 or S17, the base station 11 allocates the SRRs to NT of the terminals capable of using SRRs. A remaining portion of NT of the other terminals becomes incapable of being allocated radio resources (step S18). Process for allocating radio resources during the interval #i thus ends.

In the present embodiment, the base station allocates the maximum amount of DRRs to GT. When the total amount of GT (ΣGT) exceeds the amount of DRRs, the SRRs are allocated to GT of the terminal-A capable of using SRRs, and the maximum amount of DRRs is allocated to a remaining portion of GT. It is still assumed that radio resources cannot be allocated to remaining GT. Moreover, if surplus DRRs still remain after the DRRs have been allocated to GT, the DRRs are allocated to NT to a maximum extent. If SRRs can be allocated to NT to which the DRRs cannot be allocated, the SRRs will be allocated to the NT. If there still remains NT, the NT will be taken as one to which radio resources cannot be allocated.

Figure 4:
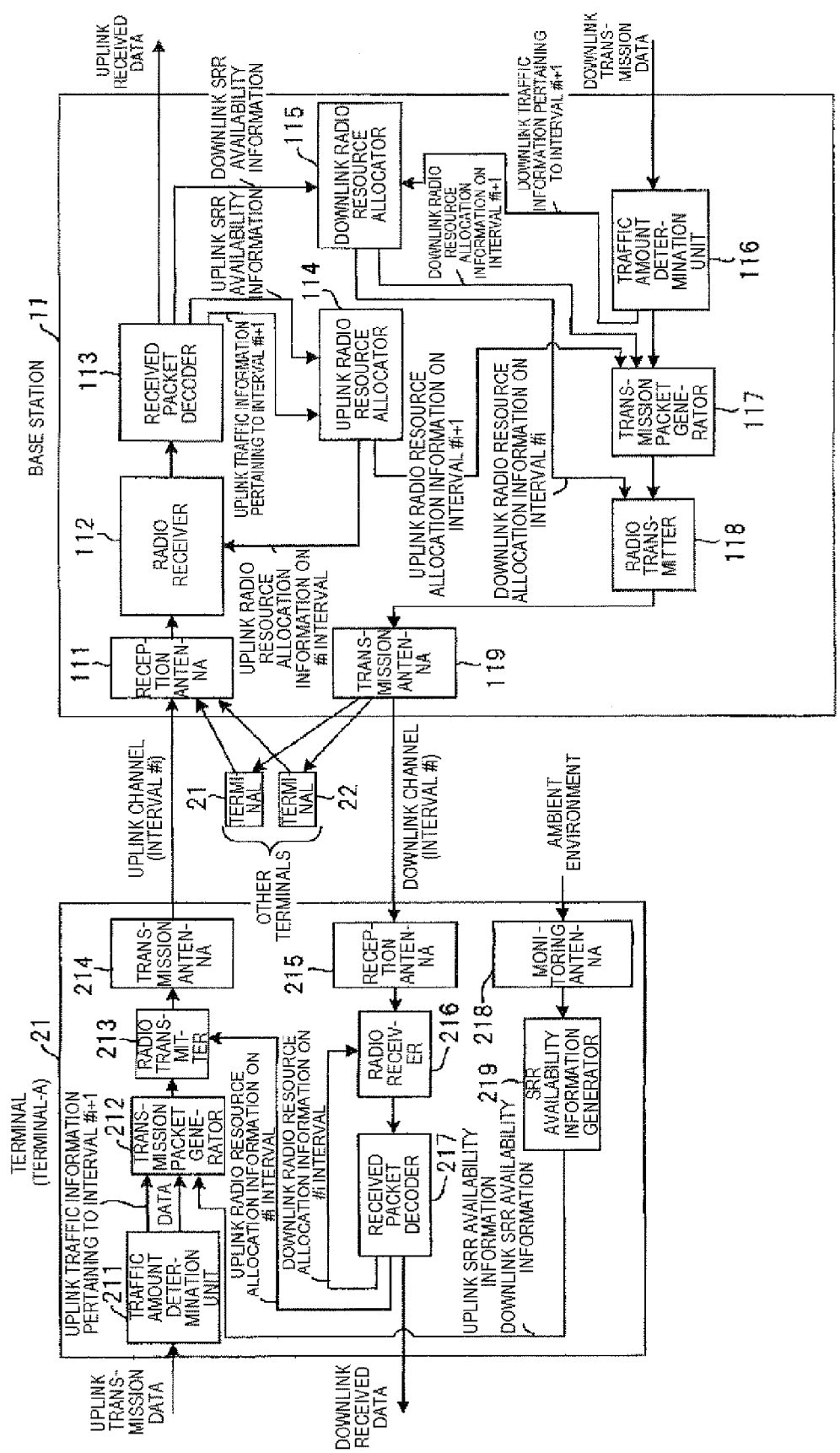
FIG. 4 is a block diagram showing a functional configuration of the base station and a functional configuration of a terminal in the radio communication system according to the embodiment.

Explanations are now given to a functional configuration of the base station and specific operation of the same, and a functional configuration of the terminal and specific operation of the same in the radio communication system according to the embodiment. FIG. 4 is a block diagram showing the functional configuration of the base station and the functional configuration of the terminal in the radio communication system according to the embodiment.

The terminal-A 21 capable of using SRRs includes a traffic amount determination unit 211, a transmission packet generator 212, a radio transmitter 213, a transmission antenna 214, a reception antenna 215, a radio receiver 216, a received packet decoder 217, a monitoring antenna 218, and an SRR availability information generator 219. The radio transmitter 213 and the radio receiver 216 act as a radio communication unit.

The monitoring antenna 218 receives a radio wave in the surrounding environment and outputs the received signal to the SRR availability information generator 219. The SRR availability information generator 219 scans a predetermined frequency band, to thus detect whether or not a radio wave having predetermined received power or more (e.g., −104 dBm/6 MHz or more) exists and determine whether or not available white space exists. The SRR availability information generator 219 determines whether or not the white space exists and outputs uplink SRR availability information showing whether or not SRRs are available for an uplink channel and downlink SRR availability information showing whether or not SRRs are available for a downlink channel. Processing for detecting available SRRs, such as that mentioned above, is performed in predetermined time units involving certain time spacing; for instance, every hour.

Data transmission for the interval #i that is a predetermined period of time is here assumed to be performed at this moment. Therefore, the preceding interval is represented as an interval #i−1, and the subsequent interval is represented as an interval #i+1. The received packet decoder 217 decodes a received packet that has been transferred during the preceding #i−1 interval through a downlink radio channel established between the base station 11 and the terminal-A 21, thereby acquiring uplink radio resource allocation information and downlink radio resource allocation information pertaining to the interval #i. The uplink radio resource allocation information pertaining to the interval #i is output to the radio transmitter 213, whereas the downlink radio resource allocation information pertaining to the interval #i is output to the radio receiver 216.

The traffic amount determination unit 211 enters uplink transmission data pertaining to the interval #i+1, thereby determining a traffic amount of GT and NT achieved during the next interval. The traffic amount determination unit 211 outputs uplink traffic information for the interval #i+1 representing a traffic amount of GT and NT achieved during the subsequent interval #i+1, along with uplink transmission data pertaining to the current interval #i.

The transmission packet generator 212 generates a transmission packet including the uplink traffic information pertaining to the interval #i+1, the uplink SRR availability information, and the downlink SRR availability information, and outputs the generated packet to the radio transmitter 213 along with the uplink transmission data pertaining to the interval #i. The radio transmitter 213 includes an encoder, a frequency converter, a modulator, a transmission RF unit, and others; and generates an RF-band transmission signal from the transmission packet generated by the transmission packet generator 212. The transmission antenna 214 transmits the transmission signal output from the radio transmitter 213. On this occasion, according to the uplink radio resource allocation information that pertains to the interval #i and that has been input from the received packet decoder 217, the radio transmitter 213 outputs a transmission signal using predetermined radio resources allocated to the transmission data of the terminal-A 21. The radio transmitter 213 has a capability of a shared frequency available/unavailable determination unit that determines, from the uplink SRR availability information, whether or not SRRs are available for the uplink channel. The transmission signal sent from the transmission antenna 214 is transferred through the uplink radio channel established between the base station 11 and the terminal-A 21, and the base station 11 receives the transferred signal.

As mentioned above, the terminal determines whether or not SRRs are available, to thus generate uplink SRR availability information and downlink SRR availability information; and reports the pieces of generated information as a part of an uplink control signal to the base station. The terminal analyzes and determines the amount of uplink traffic, thereby generating uplink traffic information and reporting the information to the base station as a part of an uplink control signal.

The reception antenna 215 receives the signal transferred through the downlink radio channel established between the base station 11 and the terminal-A 21 and outputs the received signal to the radio receiver 216. The radio receiver 216 includes a receiving RF unit, a demodulator, a frequency converter, a decoder, and others; and acquires a received packet from an RF-band signal received by way of the reception antenna 215. On this occasion, according to the downlink radio resource allocation information that pertains to the interval #i and that has been input from the received packet decoder 217, the radio receiver 216 acquires a received signal in predetermined radio resources allocated to the terminal-A 21. The received packet decoder 217 decodes the thus-acquired, received packet and outputs the uplink radio resource allocation information and the downlink radio resource allocation information pertaining to the subsequent interval #i+1 along with the downlink received data pertaining to the interval #i.

The base station 11 includes a reception antenna 111, a radio receiver 112, a received packet decoder 113, an uplink radio resource allocator 114, a downlink radio resource allocator 115, a traffic amount determination unit 116, a transmission packet generator 117, a radio transmitter 118, and a transmission antenna 119. The radio receiver 112 and the radio transmitter 118 act as a radio communication unit.

The reception antenna 111 receives a signal transferred through an uplink radio channel established between the base station 11 and the terminal-A 21 and outputs the thus-received signal to the radio receiver 112. The radio receiver 112 includes a receiving RF unit, a demodulator, a frequency converter, a decoder, and others; and acquires a received packet from an RF-band signal received by way of the reception antenna 111. According to the received signal that pertains to the interval #i−1 and that has been previously transferred through the uplink channel established between the base station 11 and the terminal-A 21, the uplink radio resource allocator 114 determines uplink radio resource allocation information pertaining to the interval #i and outputs the thus-determined information to the radio receiver 112. Therefore, in the interval #i, the radio receiver 112 acquires the received signal in the predetermined radio resources allocated to the terminal-A 21 that is a source, according to the uplink radio resource allocation information that pertains to the interval #i and that is input from the uplink radio resource allocator 114.

The received packet decoder 113 decodes the thus-acquired, received packet and outputs uplink traffic information pertaining to the interval #i+1, the uplink SRR availability information, and the downlink SRR availability information along with the uplink data received during the interval #i. The uplink traffic information pertaining to the interval #i+1 and the uplink SRR availability information are input to the uplink radio resource allocator 114, and the downlink SRR availability information is input to the downlink radio resource allocator 115.

From the uplink traffic information, which pertains to the interval #i+1 and which is input from the received packet decoder 113, and the uplink SRR availability information, the uplink radio resource allocator 114 that is an uplink channel radio resource allocator determines allocation of radio resources for the uplink during the subsequent interval #i+1. The uplink radio resource allocator 114 has a capability of the shared frequency availability determination unit that determines, from the uplink SRR availability information, whether or not SRRs are available for the uplink channel. The uplink radio resource allocator 114 outputs uplink radio resource allocation information pertaining to the interval #i+1 to the communication packet generator 117.

The traffic amount determination unit 116 inputs downlink transmission data pertaining to the interval #i+1 and determines a traffic amount of GT and NT achieved during the subsequent interval. The traffic amount determination unit 116 outputs downlink traffic information that pertains to the interval #i+1 and that represents a traffic amount of GT and a traffic amount of NT achieved during the subsequent interval #i+1, along with the downlink transmission data pertaining to the current interval #i.

From the downlink traffic information that is input from the traffic amount determination unit 116 and that pertains to the interval #i+1 and the downlink SRR availability information input from the received packet decoder 113, the downlink radio resource allocator 115 that is a downlink radio resource allocator determines allocation of downlink radio resources for the subsequent interval #i+1. The downlink radio resource allocator 115 has a capability of a shared frequency availability determination unit that determines, from the downlink SRR availability information, whether or not downlink SRRs are available. The downlink radio resource allocator 115 outputs to the communication packet generator 117 downlink radio resource allocation information pertaining to the interval #i+1. The downlink radio resource allocation block 115 determines downlink radio resource allocation information pertaining to the interval #i, from the received signal that has been previously transferred through the uplink channel established between the base station 11 and the terminal-A 21 and that pertains to the interval #i−1; and outputs the determined information to the radio transmitter 118.

The transmission packet generator 117 generates a transmission packet including the uplink radio resource allocation information and the downlink radio resource allocation information both of which pertain to the interval #i+1, and outputs to the radio transmitter 118 the transmission packet along with the downlink transmission data pertaining to the interval #i. The radio transmitter 118 includes an encoder, a frequency converter, a modulator, a transmission RF unit, and others; and generates an RF-band transmission signal from the transmission packet generated by the transmission packet generator 117. The transmission antenna 119 transmits a transmission signal output from the radio transmitter 118. On this occasion, according to the downlink radio resource allocation information that is input from the downlink radio resource allocator 115 and that pertains to the interval #i, the radio transmitter 118 outputs a transmission signal using predetermined radio resources allocated to the transmission data of the base station 11. The transmission signal sent from the transmission antenna 119 is transferred through a downlink radio channel established between the terminal-A 21 and the base station 11, and the terminal-A 21 receives the thus-transferred signal.

As mentioned above, the base station analyzes and determines a traffic amount of the downlink channel, thereby generating downlink traffic information. From the uplink SRR availability information, the downlink SRR availability information, and the uplink traffic information that are reported from the terminal and the downlink traffic information generated by the base station, the base station determines allocation of radio resources to the uplink channel and the downlink channel, thereby generating uplink radio resource allocation information and downlink radio resource allocation information. In relation to the uplink radio resource allocation information showing the nature of allocation of radio resources to the uplink channel and the downlink radio resource allocation information showing the nature of allocation of radio resources to the downlink channel, pieces of the information pertaining to one interval of the future (i.e., the interval #i+1) are reported as a part of the current (the interval #i) downlink control signal to the respective terminals.

The base station 11 conducts radio communication, in parallel, with other terminals, such as the terminal-A 21 and the terminal-B 22.

Figure 5:
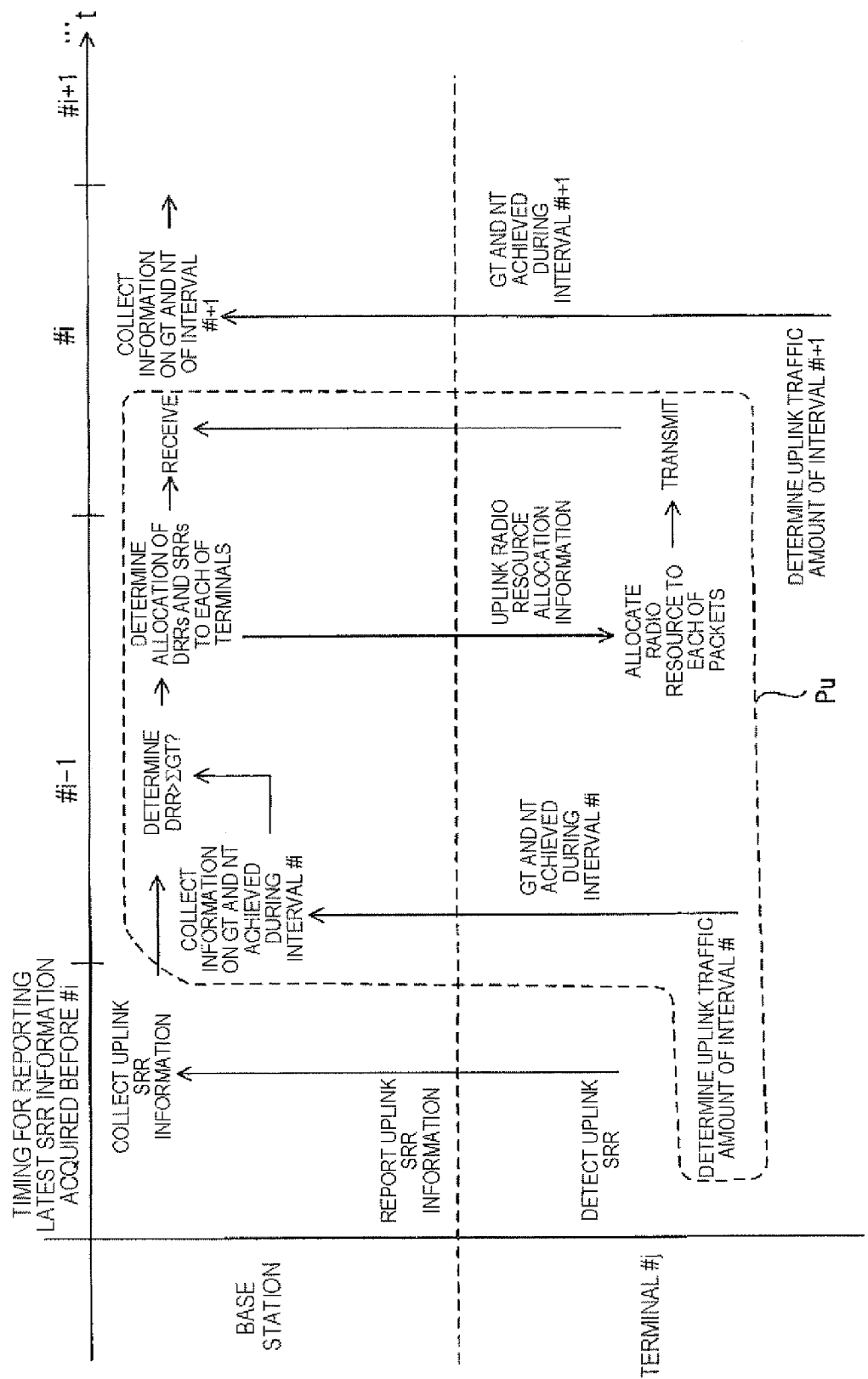
FIG. 5 is an explanatory operation diagram showing exchange of uplink data between the base station and the terminal in the radio communication system according to the embodiment.

FIG. 5 is an explanatory operation diagram showing exchange of uplink data between the base station and the terminal in the radio communication system according to the embodiment. In this case, the terminal is explained as the terminal-A capable of using SRRs.

In a terminal #j ("j" denotes an arbitrary integer), the SRR availability information generator 219 detects whether or not SRRs for an uplink channel are available by means of detecting whether or not there is available white space. The terminal #j reports uplink SRR information (uplink SRR availability information) to the base station at latest SRR information report timing prior to the interval #i. The base station receives the uplink SRR availability information from the terminal #j, to thus collect the uplink SRR information available for each of the terminals. The SRR information is reported at time spacing; for instance, every hour or every day.

Subsequently, during the #i−1 interval, the terminal #j determines an uplink traffic amount of the subsequent interval #i by means of the traffic amount determination unit 211. The terminal #j reports, to the base station, traffic amount information (uplink traffic information pertaining to the interval #i) showing GT and NT of the uplink pertaining to the interval #i. The base station receives from the terminal #j uplink traffic information pertaining to the interval #i, thereby collecting uplink GT and NT information pertaining to the interval #i required for the respective terminals.

The base station determines DRR>ΣGT by means of the uplink radio resource allocator 114 and determines, as allocation of uplink radio resources to the respective terminals, allocation of DRRs and SRRs. The base station reports to the respective terminals information on allocation of DRRs or SRRs to uplink GT and NT pertaining to the interval #i (i.e., uplink radio resource allocation information pertaining to the interval #i).

By means of the radio transmitter 213, the terminal #j subsequently allocates radio resources to respective packets in connection with uplink transmission data pertaining to the interval #i, according to the uplink radio resource allocation information that pertains to the interval #i and that has been reported from the base station. During the #i interval, the terminal #j transmits uplink transmission data to the base station. According to the uplink radio resource allocation information pertaining to the interval #i, the base station receives the uplink transmission data sent from the terminal #j.

During the interval #i, the terminal #j determines an uplink traffic amount pertaining to the subsequent #i+1 interval by means of the traffic amount determination unit 211. The terminal #j reports to the base station traffic amount information showing uplink GT and NT pertaining to the #i+1 interval (traffic information pertaining to the #i+1 interval). The base station receives uplink traffic information pertaining to the interval #i+1 from the terminal #j and collects information on uplink GT and NT pertaining to the #i+1 interval required for the respective terminals.

The above operations (processing procedures Pu enclosed by a broken line in FIG. 5) are likewise iterated during the interval #i+1 and subsequent intervals. Descriptions on FIG. 5 state that the determination made in connection with the interval #i is reflected on the interval #i+1. However, an interval subject to reflection does not always need to precede the current interval by one (i.e., the interval #i+1). An interval preceding the current interval by two (i.e., an interval #i+2) or an interval preceding the current interval by three (i.e., an interval #i+3) can also be taken as the interval subject to reflection.

Figure 6:
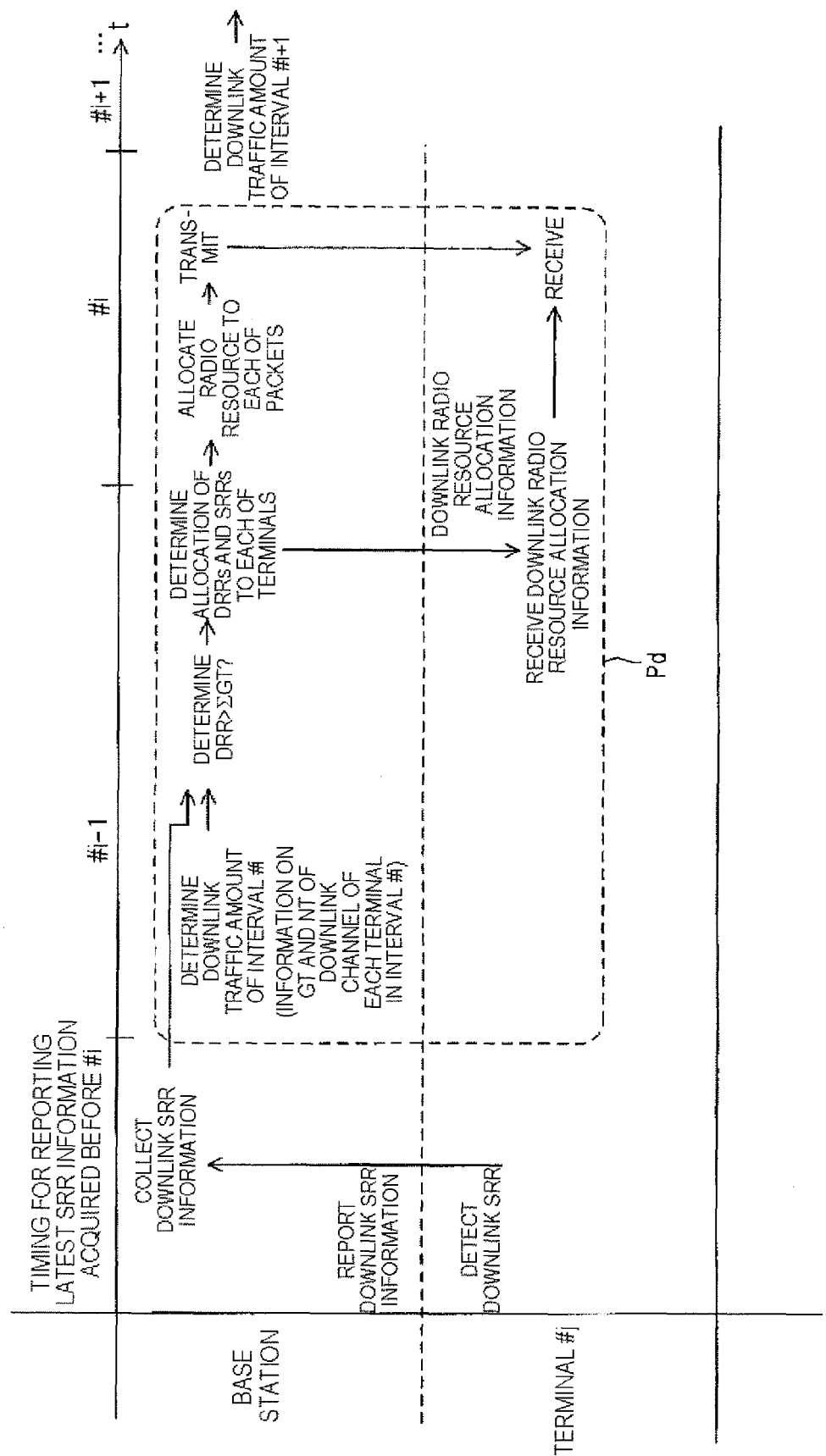
FIG. 6 is an explanatory operation diagram showing exchange of downlink data between the base station and the terminal in the radio communication system according to the embodiment.

FIG. 6 is an explanatory operation diagram showing exchange of downlink data between the base station and the terminal in the radio communication system according to the embodiment. Explanations are hereunder given to a case where the terminal is a terminal-A capable of using SRRs.

By means of the SRR availability information generator 219, the terminal #j ("j" denotes an arbitrary integer) detects whether or not downlink SRRs are available by means of detecting whether or not there is available white space. The terminal #j reports downlink SRR information (downlink SRR availability information) to the base station at latest SRR information report timing prior to the interval #i. The base station receives the downlink SRR availability information from the terminal #j, to thus collect the downlink SRR information available for each of the terminals. The SRR information is reported at time spacing; for instance, every hour or everyday.

Subsequently, during the #i−1 interval, the base station determines a downlink traffic amount of the subsequent interval #i by means of the traffic amount determination unit 116. On this occasion, the base station generates traffic amount information on downlink GT and NT that pertains to the interval #i and that is required for the respective terminals (downlink traffic information pertaining to the interval #i).

The base station determines DRR>ΣGT by means of the downlink radio resource allocator 115 and determines, as allocation of downlink radio resources to the respective terminals, allocation of DRRs and SRRs. The base station reports to the respective terminals information on allocation of DRRs or SRRs to downlink GT and NT pertaining to the interval #i (i.e., downlink radio resource allocation information pertaining to the interval #i).

By means of the radio transmitter 118, the base station subsequently allocates radio resources to respective packets in connection with downlink transmission data pertaining to the interval #i, according to the downlink radio resource allocation information that pertains to the interval #i. During the #i interval, the base station transmits downlink transmission data to the terminal #j. According to the downlink radio resource allocation information pertaining to the interval #i, the terminal #j receives the downlink transmission data sent from the base station.

During the interval #i, the base station determines a downlink traffic amount pertaining to the subsequent #i+1 interval by means of the traffic amount determination unit 116; and generates traffic amount information showing downlink GT and NT that pertains to the interval #i+1 and that is required for each of the terminals (downlink traffic information pertaining to the interval #i+1).

The above operations (processing procedures Pd enclosed by a broken line in FIG. 6) are likewise iterated during the interval #i+1 and subsequent intervals. Descriptions on FIG. 6 state that the determination made in connection with the interval #i is reflected on the interval #i+1. However, an interval subject to reflection does not always need to precede the current interval by one (i.e., the interval #i+1). An interval preceding the current interval by two (i.e., an interval #i+2) or an interval preceding the current interval by three (i.e., an interval #i+3) can also be taken as the interval subject to reflection.

Example allocation of radio resources DRRs or SRR pertaining to communication traffic GT and NT of the respective terminals is now described as allocation of radio resources to the respective terminals in the radio communication system according to the embodiment. FIG. 7 is a time chart showing an example of GT and NT of the respective terminals and an example amount of available SRR resources. FIG. 8 is a time chart showing example allocation of GT and NT of the respective terminals to DRRs or SRRs. The example shows a case where a terminal #1 (the terminal A), a terminal #2 (the terminal A), a terminal #3 (the terminal B), and a terminal #4 (the terminal B) are connected to the base station; namely, a case where a total of four terminals; namely, the two terminals A and the two terminals B, conduct communications, in parallel, with the base station.

As shown in FIG. 7, the radio resources at a dedicated frequency allocated to the base station of the radio communication system are assumed to be DRR=10. The terminal #1, among the two terminals A, is allocated SRR=10 as radio resources available at the shared frequency of white space, during the #i to #i+3 intervals. In the meantime, during the intervals #i to #i+1, the terminal #2 is assumed to be allocated SRR=8, and the terminal #2 is allocated SRR=0 during the intervals #i+2 to #i+3, and the SRRs become unavailable in midstream. The terminals #3 and #4 that are the terminals B cannot use SRRs.

During the interval #i, the terminal #1 exhibits GT=3 and NT=2; the terminal #2 exhibits GT=1 and NT=5; the terminal #3 exhibits GT=3 and NT=4; and the terminal #4 exhibits GT=0 and NT=0. During the interval #i, ΣGT=7 and Σ(GT+NT)=18 are exhibited.

During the interval #i+1, the terminal #1 exhibits GT=3 and NT=8; the terminal #2 exhibits GT=1 and NT=5; the terminal #3 exhibits GT=3 and NT=2; and the terminal #4 exhibits GT=0 and NT=0. During the interval #i+1, ΣGT=7 and Σ(GT+NT)=22 are exhibited.

During the interval #i+2, the terminal #1 exhibits GT=3 and NT=4; the terminal #2 exhibits GT=1 and NT=2; the terminal #3 exhibits GT=3 and NT=9; and the terminal #4 exhibits GT=4 and NT=20. During the interval #i+2, traffic of the terminal #4 that has not occurred before the preceding interval #i+1 occurs, and ΣGT=11 and Σ(GT+NT)=46 are exhibited.

During the interval #i+3, the terminal #1 exhibits GT=3 and NT=0; the terminal #2 exhibits GT=1 and NT=10; the terminal #3 exhibits GT=3 and NT=10; and the terminal #4 exhibits GT=4 and NT=10. During the interval #i+3, ΣGT=11 and Σ(GT+NT)=41 are exhibited.

As a result of application of the radio resource allocation method according to the embodiment described by reference to FIGS. 2 and 3, results of allocation of radio resources are as shown in FIG. 8.

During the interval #i, GT=3 of the terminal #1 is allocated to DRRs, and NT=2 of the same is allocated to the SRRs. GT=1 of the terminal #2 is allocated to the DRRs, and NT=5 of the same is allocated to SRRs. GT=3 of the terminal #3 is allocated to the DRRs, and NT=3 of NT=4 pertaining to the same terminal is allocated to the DRRs, and NT=1 becomes unallocable. In this case, since DRR>ΣGT is exhibited at ΣGT=7, three DRRs still remain even when all of the pieces of GT are allocated to the DRRs. Accordingly, three pieces of NT or less achieved at the terminal #3 can be allocated to the DRRs. Since the amount of SRRs available at the terminals #1 and #2 is greater than the amount of NT, all of the pieces of NT can be allocated to the SRRs.

During the interval #i+1, GT=3 of the terminal #1 is allocated to the DRRs, and NT=8 of the same is allocated to the SRRs. GT=1 of the terminal #2 is allocated to DRRs, and NT=5 of the same is allocated to the SRRs. GT=3 of the terminal #3 is allocated to DRRs, and NT=2 of the same is allocated to DRRs. Even in this case, ΣGT=7 is exhibited, and three DRRs still remain even when all of the pieces of GT are allocated to the DRRs. Therefore, all of the pieces of NT achieved at the terminal #3 can be allocated to the DRRs. Since the SRRs available at the terminals #1 and #2 are greater than the amount of NT, all of the pieces of NT can be allocated to the SRRs.

During the interval #i+2, GT=2 of GT=3 belonging to the terminal #1 is allocated to the DRRs; GT=1 of the same is allocated to SRRs; and NT=4 is allocated to the SRRs. GT=1 of the terminal #2 is allocated to DRRs, and NT=2 of the same becomes unallocable. GT=3 of the terminal #3 is allocated to the DRRs, and NT=9 becomes unallocable. GT=4 of the terminal #4 is allocated to the DRRs, and N=20 of the same terminals become unallocable. In this case, since DRR<ΣGT is exhibited at ΣGT=11, some of GT cannot be allocated to the DRRs. In relation to GT=1 that is a remaining resultant from allocation of GT to the DRRs, GT of the terminal #1 capable of using SRRs is allocated to the SRRs. Hence, since the SRRs available at the terminal #1 are greater than a sum of the amount of resources allocated to GT and the amount of NT, all of the pieces of NT can be allocated to the SRRs. Since the SRRs available for the terminal #2 are zero, there are any surplus DRRs. Therefore, NT cannot be allocated to the SRRS nor the DRRS. As mentioned above, when the SRRs have changed into unusable resources in the middle of concurrent communication being conducted through use of both the DRRs and the SRRs, the change is detected, and communication using the SRRs in the white space is aborted. Further, the terminals #3 and #4 also cannot allocate NT in the same manner.

During the interval #i+3, GT=2 of GT3 belonging to the terminal #1 is allocated to the DRRs, and GT=1 of the same is allocated to the SRRs. GT=1 of the terminal #2 is allocated to the DRRs, and NT=10 of the same become unallocable. GT=3 of the terminal #3 is allocated to the DRRs, and NT=10 of the same becomes unallocable. GT=4 of the terminal #4 is allocated to the DRRs, and NT=10 of the same becomes unallocable. Even in this case, DRR<ΣGT is exhibited at ΣGT=11, some of the GT cannot be allocated to the DRRs. GT of the terminal #1 capable of using SRRs is allocated to SRRs commensurate with GT=1 that is a remaining achieved after allocation of GT to the DRRs. Since SRRs available for the terminal #2 are zero, the DRRs do not have any leeway and NT cannot be allocated to the SRRs nor the DRRs. Further, NT of the terminals #3 and #4 cannot be allocated in the same manner.

According to the radio resource allocation method described in connection with the present embodiment, when SRRs of the white space are available for a terminal during a communication between the base station and the terminal, it becomes possible to allocate GT of the maximum number of terminals by use of the SRRs of the white space. Further, when the SRRs have a leeway, NT is allocated to available terminals, whereby greater throughput can be assured. On this occasion, even when the total amount of traffic that the respective terminals desire to use becomes deficient at a bandwidth of a currently-allocated frequency, a communication can be conducted by use of a frequency band of the allocated frequency and a frequency band of the white space frequency. For this reason, it becomes possible to assure depending on the situation the throughput and the number of users concurrently connected at a maximum without being restricted to the bandwidth of currently allocated frequencies.

FIG. 9 is a drawing schematically showing a frequency allocated to a telecommunication carrier that operates the radio communication system, white space, and allocation of a plurality of users (terminals) to the radio resources.

In this case, the allocated frequency corresponds to DRRs having a dedicated frequency, and white space corresponds to SRRs having a shared frequency. A GBR (guaranteed bit rate) is assumed to be set as the minimum guaranteed throughput on respective N users; namely, a user 1 to a user N (terminals 1 to N). GT is assumed to not to exceed the GBR. For brevity, traffic equivalent to the GBR is assumed to be GT, and remaining traffic is assumed to be NT.

If excess traffic over the GBR (NT in this case) is allocated to DRRs of the frequency allocated to the previously connected terminal, the GBR can be assured only for a considerably small number M of users concurrently connected. In contrast, in the present embodiment, GT reaching the GBR is preferentially allocated to the DRRs of the allocated frequency. Therefore, the number M of users concurrently connected can be increased to a number at which GT of the respective terminals can thereby be allocated to the DRRs. Moreover, in the case of a terminal capable of using the SRRs in the white space, GT of the terminal is allocated to the SRRs, whereby the number M of users concurrently connected can be further increased. Furthermore, when SRRs are available for the terminal, NT of the terminal is allocated to the SRRs, whereby greater throughput can be assured. If the DRRs have a leeway, NT of the terminal is allocated to the DRRs, so that high communication quality and greater throughput can be assured.

Next, explanations are now given to a method for billing communication charges by a communication management unit in the radio communication system according to the embodiment. The core network 10 connected to the base station 11 is provided with the communication management unit that performs various operations for controlling the radio communication system and various processing operations pertaining to system operation. In each of the telecommunication carriers that provide various services of the radio communication system, the communication management unit performs processing for billing charges in response to provision of communication service.

When billing a charge proportional to traffic amount (a packet amount, and the like) as a communication charge pertaining to radio communication of the terminals, the communication management unit calculates a communication charge for use of DRRs and another communication charge for use of the SRRs by means of different weights. For instance, in the case of the same traffic, the amount of SRRs used is given a weight smaller than that given to the amount of DRRs used. A communication charge billed for use of the SRRs is made cheaper than a communication charge billed for use of the DRRs. A communication charge is calculated by adding the bill for the DRRs used to the bill for the SRRs used. Thus, the user who uses the terminal-A capable of using the SRRs in the white space can conduct a communication at a cheaper charge when compared with a case where DRRs are used. Since many radio resources, including the SRRs, are available, a communication can be conducted at a higher throughput rate.

Example allocation of radio resources in a radio communication system including only the terminal-B that cannot use SRRs is now described as a comparative example.

Figure 10:
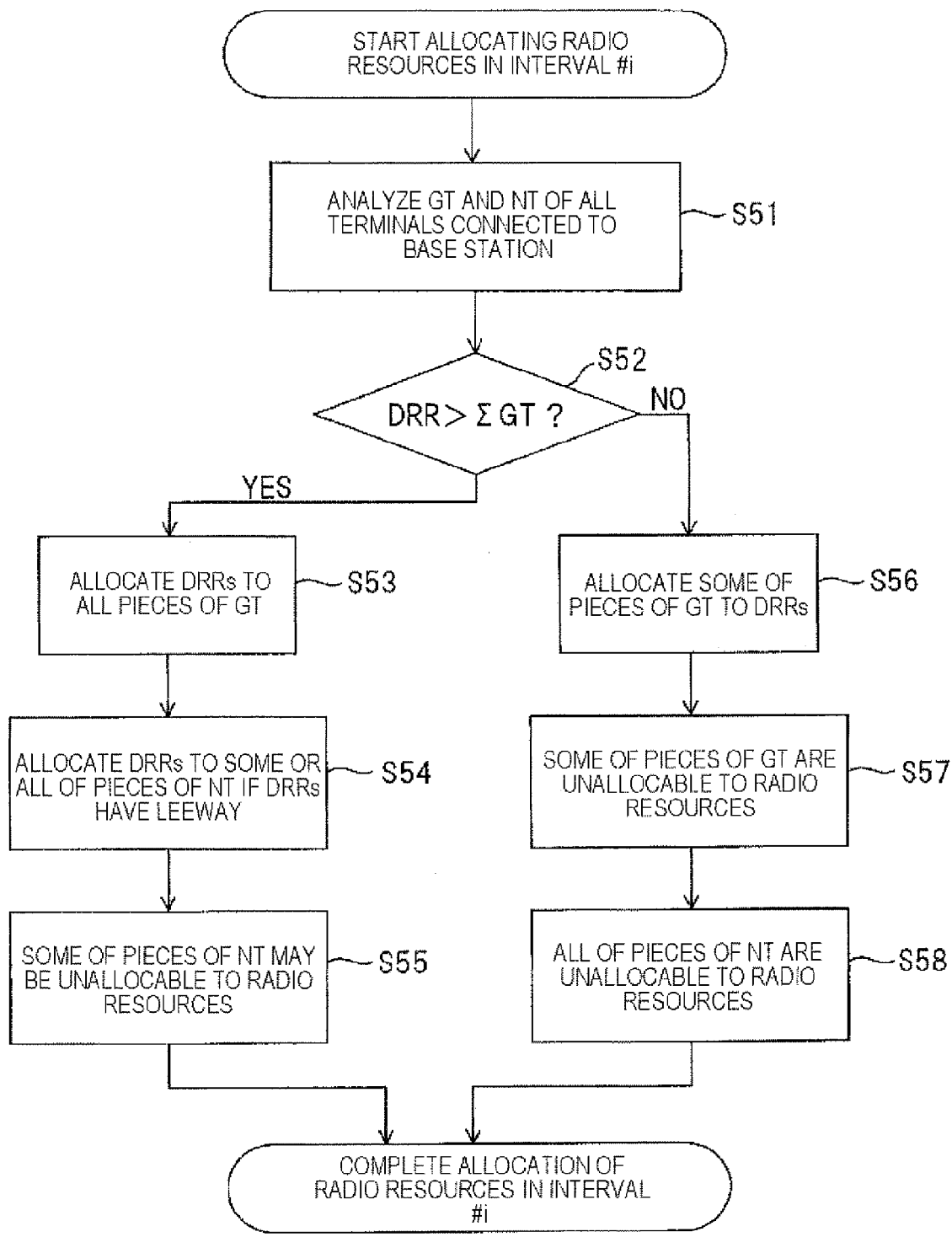
FIG. 10 is a flowchart showing procedures for allocating radio resources at a base station of a comparative example.

FIG. 10 is a flowchart showing procedures for allocating radio resources in a base station of a comparative example. Explanations are now given to the procedures for allocating radio resources during a predetermined period of interval #i ("i" is an arbitrary integer).

First, the base station analyzes GT and NT of all terminals that are in connection with the base station (step S51). On this occasion, the base station ascertains all of the pieces of GT and NT required for the respected connected terminals.

Next, the base station determines whether or not the amount of DRRs allocable to the respective terminals is greater than the total amount of GT of all of the terminals (DRR>ΣGT) (step S52). When a relationship of DRR>ΣGT stands, the base station allocates the DRRs to GT of all of the terminals (step S53). When the DRRs still have a leeway, the base station allocates the remaining DRRs to some or the entirety of NT (step S54). On this occasion, depending on the relationship between the amount of DRRs and the total amount of GT, there may be a case where radio resources cannot be allocated to some of NT (i.e., NT still remain after allocation of the DRRs) (step S53).

In the meantime, when there is a relationship of DRR<ΣGT, the base station allocates DRRs to some of GT (step S56). In this case, some of GT (GT still remain after allocation of the DRRs) becomes unallocable to the radio resources (step S57). Further, all of the pieces of NT become unallocable to the radio resources (step S58). Incidentally, admission control is usually performed when the respective terminals make a connection to the base station, and hence a case where the amount of DRRs becomes smaller than ΣGT is an irregular case.

The radio communication system of the comparative example thus completes processing for allocating radio resources during the interval #i.

FIG. 11 is a time chart showing example allocation of GT and NT of the respective terminals to the DRRs in the comparative example. The present example shows a case where four terminal-Bs from #1 to #4, which are connected to the base station, conduct communication. SRRs are unavailable for these terminals #1 to #4. Radio resources of a dedicated frequency allocated to the base station of the radio communication system are assumed to be DRR=10. The amount of traffic occurring in the respective terminals is assumed to be identical with that resultant from the example allocation referred to in connection with the present embodiment shown in FIGS. 7 and 8.

In the comparative example, a result of allocation of radio resources is yielded below as shown in FIG. 11.

During the interval #i, GT=3 of the terminal #1 is allocated to the DRRs, and NT=2 of the same is allocated to the DRRs.

GT=1 of the terminal #2 is allocated to DRRs; NT=1 of NT=5 belonging to the terminal #2 is allocated to the DRRs; and NT=4 becomes unallocable. GT3 of the terminal #3 is allocated to the DRRs, and NT=4 of the same becomes unallocable. In this case, DRR>ΣGT stands at ΣGT=7, three DRRs still remain even after all of the pieces of GT are allocated to the DRRs. For this reason, any one of the pieces of NT of the respective terminals, which is equal to or smaller than three DRRs in terms of an amount, can be allocated to the DRRs. Provided that NT of a terminal given a smaller number is preferentially allocated to the DRRs, the entire NT of the terminal #1 and some of NT of the terminal #2 are allocable to the DRRs.

During the interval #i+1, GT=3 of the terminal #1 is allocated to the DRRs; NT=2 of NT=8 belonging to the same terminal is allocated to the DRRs; and NT=6 of the same becomes unallocable. GT=1 of the terminal #2 is allocated to the DRRs; NT=1 of NT=5 belonging to the terminal #2 is allocated to the DRRs; and NT=4 of the same becomes unallocable. GT=3 of the terminal #3 is allocated to the DRRs, and NT=2 of the same becomes unallocable. Even in this case, ΣGT=7 stands, and three DRRs still remain even after all of the pieces of GT are allocated to the DRRs. Therefore, provided that NT is allocated likewise in succession to the preceding interval #i, some of NT of the terminals #1 and #2 will be allocable to the DRRs.

During the interval #i+2, GT=3 of the terminal #1 is allocated to the DRRs, and NT=4 of the same becomes unallocable. GT=1 of the terminal #2 is allocated to the DRRs, and NT=2 of the same becomes unallocable. GT=3 of the terminal #3 is allocated to the DRRs, and NT=9 of the same becomes unallocable. GT=3 of GT=4 belonging to the terminal #4 is allocated to the DRRs; GT=1 of the same becomes unallocable; and NT=20 of the same also becomes unallocable. In this case, since DRR<ΣGT stands at ΣGT=11, some of GT becomes unallocable to the DRRs; and some of GT of the terminal #4 where traffic has newly occurred becomes unallocable. Further, NT of all of the terminals becomes unallocable.

During the interval #i+3, GT=3 of the terminal #1 is allocated to the DRRs. GT=1 of the terminal #2 is allocated to the DRRs, and NT=10 of the same becomes unallocable. GT=3 of the terminal #3 is allocated to the DRRs, and NT=10 of the same becomes unallocable. GT=3 of GT=4 belonging to the terminal #4 is allocated to the DRRs; GT=1 of the same becomes unallocable; and NT=10 of the same also becomes unallocable. Even in this case, DRR<ΣGT stands at ΣGT=11, some of GT becomes unallocable to the DRRs. Further, some of GT of the terminal #4 still remains unallocable in succession to the preceding interval #i+2. Moreover, NT of all of the terminals becomes unallocable.

As mentioned above, in the radio communication system of the comparative example, available radio resources are limited to a bandwidth of the dedicated frequency allocated to the base station of the radio communication system. Therefore, there arises a ease where sufficient throughput for the respective terminals cannot be assured. When the minimum guaranteed throughput is set, the number of users concurrently connected is restricted to a small number.

In contrast, in the radio communication system according to the embodiment, high throughput and an increase in the number of users concurrently connected can be accomplished by effective utilization of the white space. As illustrated in FIG. 9, DRRs of a dedicated frequency that is an allocated frequency are used, by way of example, for communication commensurate with the minimum guaranteed throughput. Further, SRRs in white space of the shared frequency are used for excess communication over the minimum guaranteed throughput. Both providing the minimum guaranteed throughput and an increase in the number of users concurrently connected can be thereby implemented. For instance, 500 kbps is assured as the minimum guaranteed throughput for an IP network camera. The throughput is allocated to DRRs. If SRRs in the white space are available, excess throughput over 500 kbps is used while being allocated to the SRRs. In many case, it becomes possible to provide a throughput of at least 500 kbps while high speed transfer at a rate of megabytes is provided.

When the SRRs have changed to an unavailable state in the middle of use of the white space, the terminal detects the change and reports the change to the base station, whereupon communication utilizing the SRRs in the white space is halted. Interference in communication of the primary user who is allocated to frequencies of the white space can be thereby avoided.

A communication charge can also be calculated by imposing one weight on the traffic amount using radio resources of a dedicated frequency allocated to the radio communication system and also another different weight traffic amount using radio resources of the shared frequency of the white space. When a communication using the white space is provided at low price, the user can assure great throughput by use of the white space, and inexpensive communication becomes feasible.

The present invention is scheduled to be subject to various alterations and applications conceived by the persons skilled in the art on the basis of the descriptions of the specification and the well known technique and without departing the drift and scope of the present invention. The alterations and applications shall fall within a range where protection of the invention is sought. Constituent elements according to the embodiment can also be arbitrarily combined without departing from the scope of the drift of the present invention.

For instance, when there is not a distinction between GT and NT of the radio communication system; namely, when all of the pieces of traffic of the system correspond to NT, enhancing system capacity by utilization of both a dedicated frequency and a shared frequency, which is the drift of the present invention, can also be accomplished.

The present invention can also be configured by means of hardware or implemented by means of software.

Respective functional blocks used in the descriptions according to the embodiment are implemented as an LSI that is typically an integrated circuit. These blocks may also be individually implemented as one chip. Alternatively, the functional blocks can also be implemented as one chip so as to include some or all of the functional blocks. The functional blocks are implemented as an LSI but may also be referred to as an IC, a system LSI, a super LSI, or an ultra LSI according to a degree of integration.

The technique for implementing an integrated circuit is not limited to the LSI technique. The functional blocks can also be implemented by means of a custom-designed circuit or a general-purpose processor. Further, there can also be utilized an FPGA (Field Programmable Gate Array) that can be programmed after manufacture of an LSI or a reconfigurable processor that can reconfigure connections to and settings of circuit cells in the LSI.

Moreover, if another technique for implementing an integrated circuit that will be a substitute of an LSI has come on the field by virtue of a progress in semiconductor techniques or another derivative of the semiconductor techniques, it is natural that the functional blocks be integrated by use of the technique. Adoption of biotechnologies, or the like, is feasible.

Various aspects according to the embodiment of the present invention include the followings:

(1) A radio base station to be provided in a radio communication system, the radio base station including: a radio communication unit that is configured to conduct a communication through traffic with a radio communication terminal connected to the radio base station in a shared frequency utilizing white space in addition to a dedicated frequency allocated to the radio communication system; and a radio resource allocator that is configured to allocate radio resources of the dedicated frequency to first traffic and radio resources of the shared frequency to second traffic, wherein the traffic through which the communication is established with the radio communication terminal includes the first traffic whose bandwidth is guaranteed and the second traffic whose bandwidth is not guaranteed.

With the configuration, it becomes possible to assure depending on the situation the throughput and the number of users concurrently connected at a maximum without being limited to a bandwidth of a frequency currently allocated in the radio communication by use of the shared frequency utilizing the white space in addition to the dedicated frequency.

(2) The radio base station, in which the radio resource allocator allocates radio resources of the dedicated frequency to some of the second traffic when a total amount of radio resources at the dedicated frequency is greater than a total amount of the first traffic.

With the configuration, when the total amount of radio resources of the dedicated frequency is greater than the total, amount of the first traffic, the radio resources of the dedicated frequency are utilized, thereby making some of the second traffic communicable.

(3) The radio base station, in which the radio resource allocator allocates radio resources of the shared frequency to some of the first traffic when a total amount of the first traffic is greater than a total amount of radio resources of the dedicated frequency.

With the configuration, when the total amount of first traffic is greater than the total amount of radio resources of the dedicated frequency, some of the first traffic becomes communicable by utilization of the radio resources of the shared frequency.

(4) The radio base station further including a shared frequency availability determination unit that is configured to determine whether or not radio resources of the shared frequency are available, wherein the radio resource allocator allocates radio resources of the shared frequency to the second traffic when radio resources of the shared frequency are available according to a result of determination rendered by the shared frequency availability determination unit.

With the configuration, it is possible to determine whether or not the radio resources of the shared frequency are available. When the radio resources are available, a communication can be conducted by utilization of the radio resources of the shared frequency.

(5) The radio base station, in which in a case where the radio base station conducts parallel communications with a first radio communication terminal that is capable of conducting a communication by use of the shared frequency and a second radio communication terminal that is capable of conducting a communication by use of the shared frequency, the radio resource allocator preferentially allocates radio resources of the dedicated frequency to the first traffic established with the second radio communication terminal and allocates the radio resources of the shared frequencies to the first traffic established with the first radio communication terminal when a total amount of the first traffic is greater than a total amount of radio resources of the dedicated frequency.

With the configuration, when the base station conducts parallel communications with the first radio communication terminal that conducts the communication by use of the shared frequency and the second radio communication terminal that cannot use the shared frequency, it becomes possible to assure the throughput and the number of users concurrently connected at a maximum depending on the situation by use of the shared frequency utilizing the white space.

(6) The radio base station, in which the radio communication unit includes a radio transmitter that is configured to output a transmission signal using the radio resources allocated to transmission data directed to the radio communication terminal in accordance with downlink radio resource allocation information determined by the radio resource allocator.

With the configuration, it becomes possible to transmit data to the radio communication terminal from the radio base station through a downlink while the throughput and the number of users concurrently connected are assured at a maximum depending on the situation.

(7) A radio communication terminal to be used in a radio communication system, the radio communication terminal including: a radio communication unit that is configured to conduct a communication through traffic with a radio base station connected to the radio communication terminal in a shared frequency utilizing white space in addition to a dedicated frequency allocated to the radio communication system, wherein the radio communication unit includes a radio transmitter that is configured to output a transmission signal utilizing radio resources allocated to transmission data directed to the base station so that radio resources of the dedicated frequency are allocated to first traffic and that radio resources of the shared frequency are allocated to second traffic, wherein the traffic through which the communication is established with the radio base station includes the first traffic whose bandwidth is guaranteed and the second traffic whose bandwidth is not guaranteed.

With the configuration, it becomes possible to assure depending on the situation the throughput and the number of users currently connected at a maximum without being limited to a bandwidth of a frequency concurrently allocated in the radio communication by use of the shared frequency utilizing the white space in addition to the dedicated frequency.

(8) The radio communication terminal, in which the radio transmitter transmits data through some of the second traffic allocated to the radio resources of the dedicated frequency when a total amount of the radio resources of the dedicated frequency is greater than a total amount of the first traffic.

With the configuration, when the total amount of the radio resources of the dedicated frequency is greater than the total amount of the first traffic, some of the second traffic is made communicable by utilization of the radio resources of the dedicated frequency.

(9) The radio communication terminal, in which the radio transmitter transmits data through some of the first traffic allocated to the radio resources of the shared frequency when a total amount of the first traffic is greater than a total amount of radio resources of the dedicated frequency.

With the configuration, when the total amount of the first traffic is greater than the total amount of radio resources of the dedicated frequency, some of the first traffic is made communicable by utilization of the radio resources of the shared frequency.

(10) The radio communication terminal, in which the radio communication unit acquires uplink radio resource allocation information reported from the radio base station and allocates radio resources pertaining to the first traffic and radio resources pertaining to the second traffic by use of the radio resource allocation information.

With the configuration, it is possible to allocate the radio resources pertaining to the first traffic and the second traffic according to the radio resource allocation information reported from the radio base station while the throughput and the number of users concurrently connected are assured at a maximum depending on the situation.

(11) The radio communication terminal further including a shared frequency availability determination unit that is configured to determine whether or not the radio resources of the shared frequency are available, wherein the radio transmitter allocates the radio resources of the shared frequency to the second traffic when the radio resources of the shared frequency are available in accordance with a result of determination rendered by the shared frequency availability determination unit.

With the configuration, it is possible to determine whether or not the radio resources of the shared frequency are available. When the radio resources are available, a communication can be conducted by utilization of the radio resources of the shared frequency.

(12) A radio communication system that conducts a communication between a radio base station and a radio communication terminal, wherein the radio base station includes: a radio communication unit that is configured to conduct a communication through traffic with the radio communication terminal connected to the radio base station in a shared frequency utilizing white space in addition to a dedicated frequency allocated to the radio communication system; and a radio resource allocator that is configured to allocate radio resources of the dedicated frequency to first traffic and radio resources of the shared frequency to second traffic, wherein the traffic through which the communication is established with the radio communication terminal includes the first traffic whose bandwidth is guaranteed and the second traffic whose bandwidth is not guaranteed, wherein the radio communication unit includes a radio transmitter that is configured to outputs a transmission signal using radio resources allocated to transmission data directed to the radio communication terminal in accordance with downlink radio resource allocation information determined by the radio resource allocator, and wherein the radio communication terminal includes: a radio communication unit that is configured to conduct a communication through the traffic with the radio base station in the shared frequency utilizing the white space in addition to the dedicated frequency allocated to the radio communication system, wherein the radio communication unit includes a radio transmitter that is configured to output a transmission signal using radio resources allocated to transmission data directed to the radio base station in accordance with uplink radio resource allocation information reported from the radio base station.

With the configuration, it becomes possible to assure depending on the situation the throughput and the number of users concurrently connected at a maximum without being limited to a bandwidth of a frequency currently allocated in the radio communication by use of the shared frequency utilizing the white space in addition to the dedicated frequency.

(13) A communication management method applied in the radio communication system in which a communication charge concerning a radio communication of the radio communication terminal is calculated by imposing a weight on traffic using radio resources of the dedicated frequency and another different weight on traffic using radio resources of the shared frequency in a communication management unit placed in a core network connected to the radio base station.

With the configuration, the communication charge is calculated by imposing one weight on the traffic amount using radio resources of the dedicated frequency and also another different weight on the traffic amount using radio resources of the shared frequency. Accordingly, the user who uses terminals capable of using radio resources of the shared frequency can conduct communications at low communication charge when using the shared frequency. Moreover, many radio resources including radio resources of the shared frequency in addition to radio resources of the dedicated frequency are available. Hence, a communication can be conducted at higher throughput.

The aspect of the present invention yields an advantage of the ability to assure depending on the situation the throughput and the number of users concurrently connected at a maximum without being limited to a bandwidth of a frequency currently allocated in radio communication. It is useful as; for instance, a radio communication system that is applicable to a radio communication of a mobile communication network and that conducts a communication between a radio base station and a radio communication terminal, a radio base station and a radio communication terminal for use with the system, and the like.

This application is based on and claims the benefit of Japanese Patent Application No. 2010-290474 filed on Dec. 27, 2010, the contents of which are incorporated herein by reference.

What is claimed is:

1. A radio base station to be provided in a radio communication system, the radio base station including:
   a radio communication unit that is configured to conduct a communication through traffic in a shared frequency utilizing white space in addition to a dedicated frequency allocated to the radio communication system; and
   a radio resource allocator that is configured to allocate radio resources of the dedicated frequency to first traffic and radio resources of the shared frequency to second traffic, wherein the traffic through which the communication is established includes the first traffic whose bandwidth is guaranteed and the second traffic whose bandwidth is not guaranteed,
   wherein the radio resource allocator allocates, based on a total amount of radio resources at the dedicated frequency, the radio resources of the dedicated frequency to at least some of the second traffic or the radio resources of the shared frequency to at least some of the first traffic.

2. The radio base station according to claim 1, wherein
   the radio resource allocator allocates radio resources of the dedicated frequency to some of the second traffic when the total amount of radio resources at the dedicated frequency is greater than a total amount of the first traffic.

3. The radio base station according to claim 1, wherein
   the radio resource allocator allocates radio resources of the shared frequency to some of the first traffic when the total amount of the first traffic is greater than a total amount of radio resources of the dedicated frequency.

4. The radio base station according to claim 1 further comprising
a shared frequency availability determination unit that is configured to determine whether or not radio resources of the shared frequency are available, wherein
the radio resource allocator allocates radio resources of the shared frequency to the second traffic when radio resources of the shared frequency are available according to a result of determination rendered by the shared frequency availability determination unit.

5. The radio base station according to claim 1, wherein
in a case where the radio base station conducts parallel communications with a first radio communication terminal that is capable of conducting a communication by use of the shared frequency and a second radio communication terminal that is capable of conducting a communication by use of the shared frequency;
the radio resource allocator preferentially allocates radio resources of the dedicated frequency to the first traffic established with the second radio communication terminal and allocates the radio resources of the shared frequencies to the first traffic established with the first radio communication terminal when a total amount of the first traffic is greater than the total amount of radio resources of the dedicated frequency.

6. The radio base station according to claim 1, wherein
the radio communication unit includes a radio transmitter that is configured to output a transmission signal using the radio resources allocated to transmission data directed to the radio communication terminal in accordance with downlink radio resource allocation information determined by the radio resource allocator.

7. A radio communication terminal to be used in a radio communication system, the radio communication terminal comprising:
a radio communication unit that is configured to conduct a communication through traffic with a radio base station connected to the radio communication terminal in a shared frequency utilizing white space in addition to a dedicated frequency allocated to the radio communication system, wherein
the radio communication unit includes a radio transmitter that is configured to output a transmission signal utilizing radio resources allocated to transmission data directed to the base station so that radio resources of the dedicated frequency are allocated to first traffic and that radio resources of the shared frequency are allocated to second traffic, wherein the traffic through which the communication is established with the radio base station includes the first traffic whose bandwidth is guaranteed and the second traffic whose bandwidth is not guaranteed,
wherein the radio resources are allocated based on a total amount of radio resources at the dedicated frequency and, based on the allocation, the radio transmitter transmits at least some of the second traffic through radio resources of the dedicated frequency or at least some of the first traffic through radio resources of the shared frequency.

8. The radio communication terminal according to claim 7, wherein
the radio transmitter transmits data through some of the second traffic allocated to the radio resources of the dedicated frequency when the total amount of the radio resources of the dedicated frequency is greater than a total amount of the first traffic.

9. The radio communication terminal according to claim 7, wherein
the radio transmitter transmits data through some of the first traffic allocated to the radio resources of the shared frequency when a total amount of the first traffic is greater than the total amount of radio resources of the dedicated frequency.

10. The radio communication terminal according to claim 7, wherein
the radio communication unit acquires uplink radio resource allocation information reported from the radio base station and allocates radio resources pertaining to the first traffic and radio resources pertaining to the second traffic by use of the radio resource allocation information.

11. The radio communication terminal according to claim 7, further comprising
a shared frequency availability determination unit that is configured to determine whether or not the radio resources of the shared frequency are available, wherein
the radio transmitter allocates the radio resources of the shared frequency to the second traffic when the radio resources of the shared frequency are available in accordance with a result of determination rendered by the shared frequency availability determination unit.

12. A radio communication system that conducts a communication between a radio base station and a radio communication terminal, wherein
the radio base station comprises:
a radio communication unit that is configured to conduct a communication through traffic with the radio communication terminal connected to the radio base station in a shared frequency utilizing white space in addition to a dedicated frequency allocated to the radio communication system; and
a radio resource allocator that is configured to allocate radio resources of the dedicated frequency to first traffic and radio resources of the shared frequency to second traffic, wherein the traffic through which the communication is established with the radio communication terminal includes the first traffic whose bandwidth is guaranteed and the second traffic whose bandwidth is not guaranteed, wherein
the radio communication unit includes a radio transmitter that is configured to output a transmission signal using radio resources allocated to transmission data directed to the radio communication terminal in accordance with downlink radio resource allocation information determined by the radio resource allocator, and wherein
the radio communication terminal comprises
a radio communication unit that is configured to conduct a communication through the traffic with the radio base station in the shared frequency utilizing the white space in addition to the dedicated frequency allocated to the radio communication system, wherein
the radio communication unit includes a radio transmitter that is configured to output a transmission signal using radio resources allocated to transmission data directed to the radio base station in accordance with uplink radio resource allocation information reported from the radio base station.

13. A communication management method applied in the radio communication system as defined in claim 12, wherein
a communication charge concerning a radio communication of the radio communication terminal is calculated by imposing a weight on traffic using radio resources of the dedicated frequency and another different weight on traffic using radio resources of the shared frequency in a communication management unit placed in a core network connected to the radio base station.

14. A radio communication method in a radio communication system that conducts a communication through traffic with a radio base station, the radio communication method comprising:

communicating by the radio base station though the traffic in a shared frequency utilizing white space in addition to a dedicated frequency allocated to the radio communication system; and allocating radio resources of the dedicated frequency to first traffic and radio resources of the shared frequency to second traffic, wherein the traffic through which the communication is established with the radio base station includes the first traffic whose bandwidth is guaranteed and the second traffic whose bandwidth is not guaranteed, wherein the allocating includes, based on a total amount of radio resources at the dedicated frequency, allocating radio resources of the dedicated frequency to at least some of the second traffic or radio resources of the shared frequency to at least some of the first traffic.

* * * * *